United States Patent [19]

Fuller

[11] Patent Number: 4,478,116

[45] Date of Patent: Oct. 23, 1984

[54] BELT DRIVE FOR MACHINE FOR RESURFACING VEHICLE BRAKE DISCS

[75] Inventor: Robert L. Fuller, Rhinelander, Wis.

[73] Assignees: William J. Kopecko; Joseph O. Duchac, both of Rhinelander, Wis. ; part interest to each

[21] Appl. No.: 413,756

[22] Filed: Sep. 1, 1982

[51] Int. Cl.³ .............................................. B23B 5/02
[52] U.S. Cl. ..................................... 82/4 A; 82/24 R
[58] Field of Search .............. 82/4 A, 4 R, 4 C, 24 R, 82/28 R, 6

[56] References Cited

U.S. PATENT DOCUMENTS

| 1,407,834 | 2/1922 | Bouillon | 82/28 R |
| 2,395,586 | 2/1946 | Scott | 82/24 R |
| 2,663,975 | 12/1953 | Barrett | 82/4 A |

FOREIGN PATENT DOCUMENTS

| 2540187 | 3/1977 | Fed. Rep. of Germany | 82/4 A |
| 2026920 | 2/1980 | United Kingdom | 82/4 A |

Primary Examiner—Leonidas Vlachos
Attorney, Agent, or Firm—James E. Nilles

[57] ABSTRACT

Apparatus for resurfacing vehicle brake discs by machining opposite sides of the brake disc by a pair of tools and in which the tools can be moved by a lead screw and including a motor which is coupled to the lead screw by a belt for driving it and including means for decoupling the motor to the lead screw including means for loosening the belt so it will not drive the lead screw.

4 Claims, 4 Drawing Figures

BELT DRIVE FOR MACHINE FOR RESURFACING VEHICLE BRAKE DISCS

BACKGROUND OF THE INVENTION

1. Field of the Invention

This invention relates in general to apparatus for resurfacing vehicle brake discs and in particular to a novel belt drive for the resurfacing apparatus.

2. Description of the Prior Art

Disc brakes have become very common on vehicles such as motor vehicles and it is necessary after they are worn to resurface the brake discs. It is very expensive and time consuming to remove the brake discs from the vehicle so that they can be resurfaced and then remount them on the vehicle and apparatus are known for resurfacing the brake disc without removing the disc from the vehicle. Such devices mount to a caliper holder of the vehicle and have a pair of tools which engage opposite faces of the discs to machine them as the tools are moved outwardly on the surface of the disc.

SUMMARY OF THE INVENTION

The present invention provides for a motor drive which is coupled to the lead screw for driving the cutting tools of a brake disc finishing apparatus so that the disc can be automatically machined as the disc is rotated. The motor is coupled by a belt to the lead screw which drives the cutting tools and is pivotally mounted relative to the lead screw by a bracket such that the motor can be locked so as to maintain the belt under tension so that the motor will drive the lead screw and the motor can be pivoted toward the lead screw so as to loosen the belt when driving is not desired.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
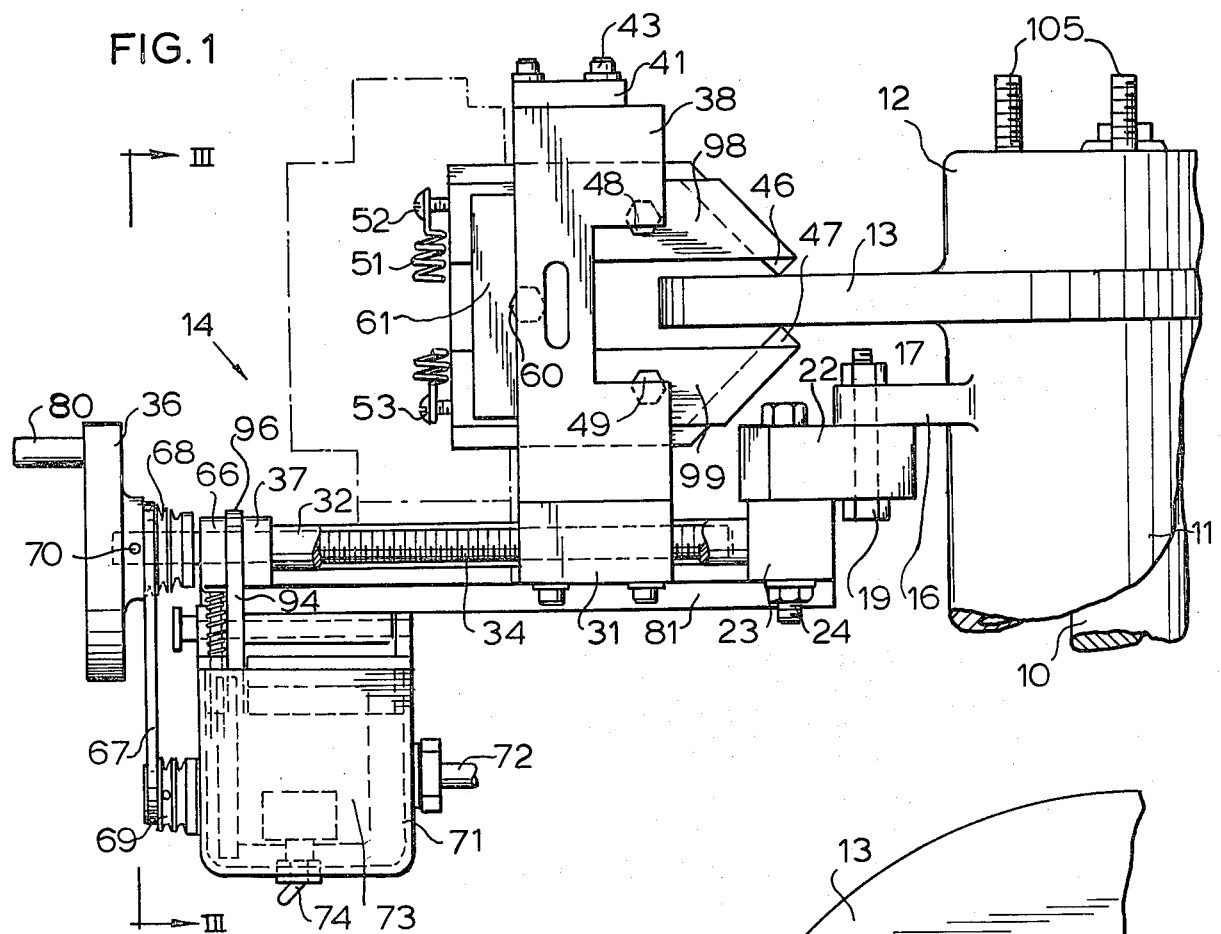
FIG. 1 is a top plan view of the invention.
Figure 2:
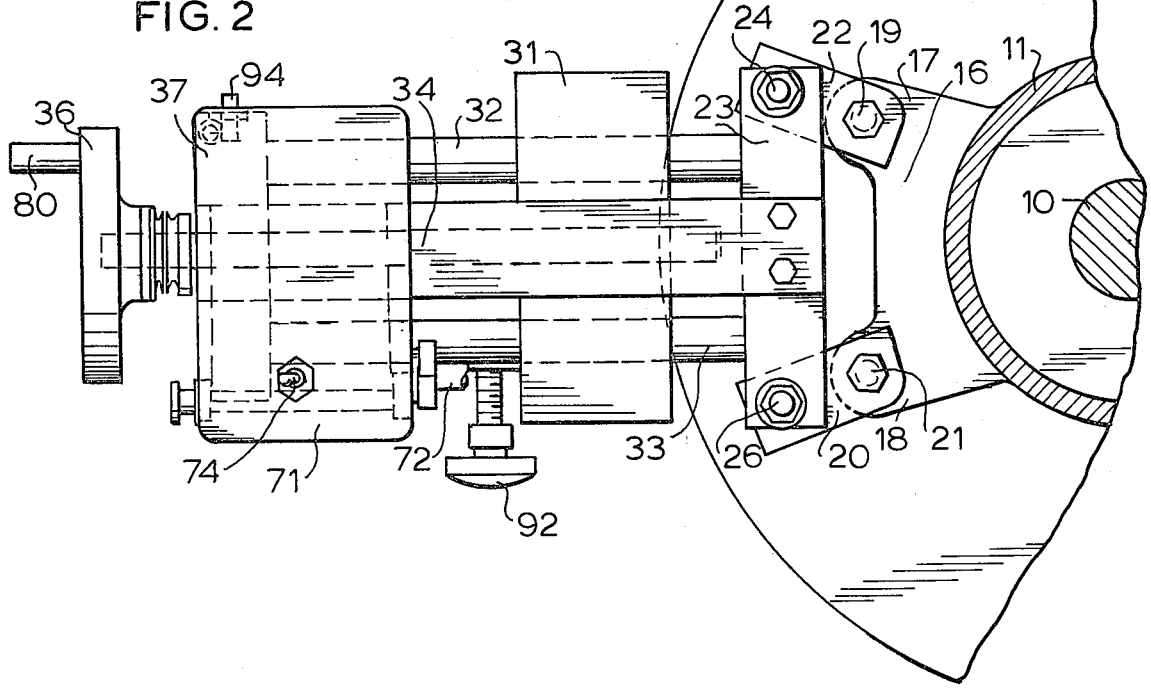
FIG. 2 is a side plan view of the invention.
Figure 3:
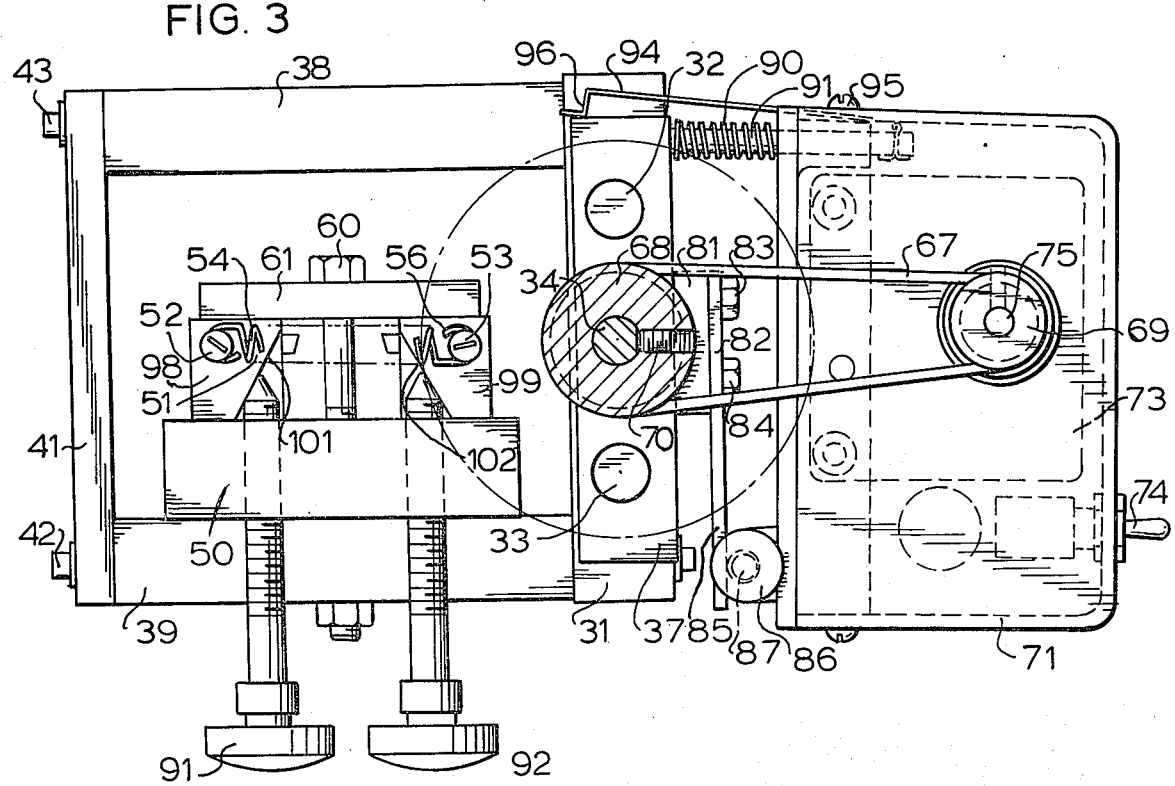
FIG. 3 is a sectional view on line III—III from FIG. 1.

FIGS. 1 and 2 illustrate the disc resurfacing tool 14 which is mounted to the calipers bracket 16 of a vehicle which has an axle 10 that turns a disc 13 and hub 12 upon which a suitable wheel can be mounted. The hub housing 11 surrounds the axle 10 and carries the caliper mounting bracket 16 which has a pair of extensions 17 and 18 formed with suitable openings through which bolts 19 and 21 extend to connect links 20 and 22 to the bracket 16. The links 20 and 22 are connected to opposite ends of a vertical member 23 by bolts 24 and 26. A longitudinal member 34 connects the member 23 to a frame member 37 and a pair of guide rods 32 and 33 extend between the frame members 23 and 37. A lead screw 34 is suitably mounted for rotation in the frame member 37 and drives a tool carrying carriage 31 which is threadedly connected to the lead screw 34 and through which the guide rods 32 and 33 extend. The member 31 supports a pair of transverse members 38 and 39 as shown in FIG. 3 and a vertical member 41 is connected to the remote ends of the members 38 and 39 by bolts 42 and 43. A transverse member 50 is mounted on the member 38 or 39 by a bolt 60 which also extends to an upper frame member 61. A pair of pivotally mounted tool holding members 98 and 99 are pivotally mounted to the member 50 by pivot pins 48 and 49 and carry cutting tools 46 and 47 which engage opposite faces of the disc 13 for refinishing it.

A spring 51 biases the rear ends of tool holding members 98 and 99 toward each other and is connected to the members 98 and 99 by bolts 52 and 53. Adjusting screws 91 and 92 are threadedly received in the member 50 and have points which engage cam surfaces 101 and 102 of the tool holding members 98 and 99 so as to adjust them.

Figure 4:
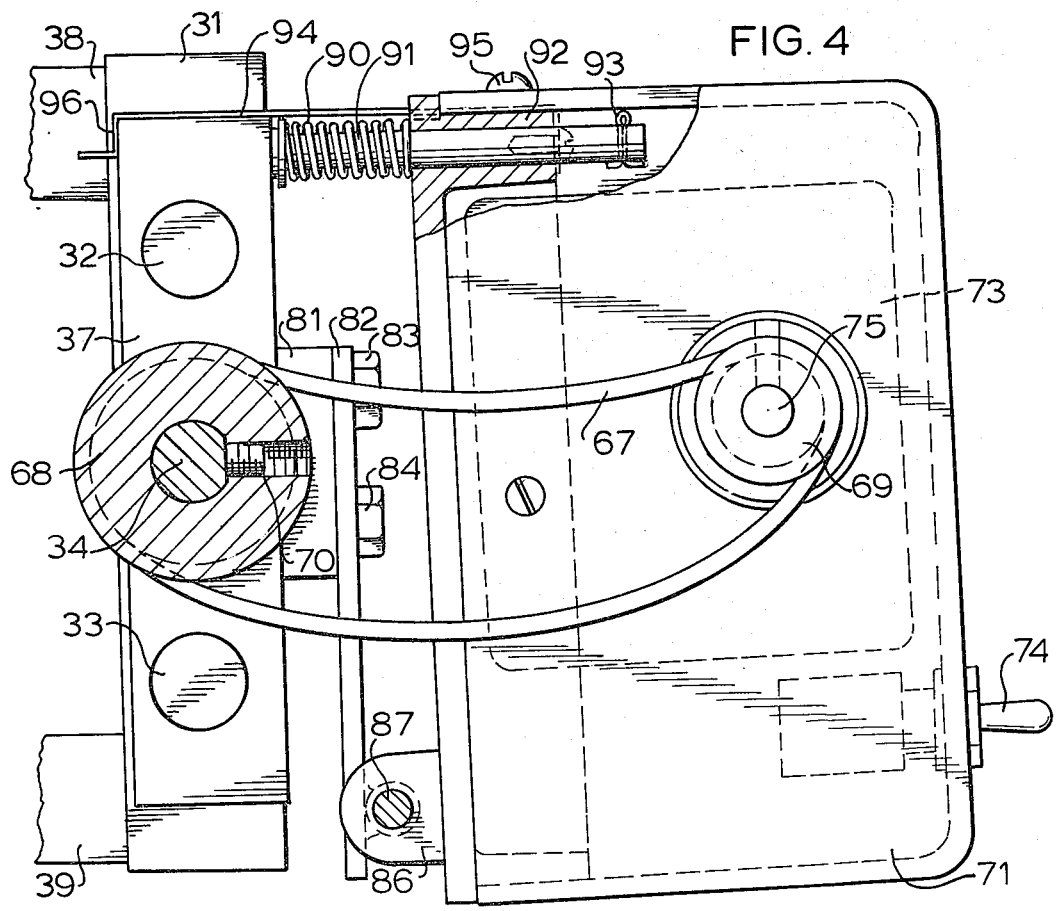
FIG. 4 illustrates the invention where the motor does not drive the lead screw.

A motor 73 which may be a gear motor with an output shaft 75 is mounted in a housing 71 which has a bracket 86 through which a pivot pin 87 extends to pivotally connect it to a vertical member 82. The vertical member 82 is connected by bolts 83 and 84 to a block member 81 which is connected to member 37 by the bolts 83 and 84. The motor housing 71 supports a pin 91 which extends through a portion 92 of the housing 71 and bears against the member 37. The spring 90 biases the upper end of the housing 71 relative to FIG. 4 away from the member 37. A cotter key and prevents the pin 91 from being withdrawn through the member 92. A spring member 94 is connected by a bolt 95 to the housing 71 and has a stop portion 96 which is engageable with the back surface of the frame member 37 as illustrated in FIG. 4 so as to lock the housing 71 so that it cannot be biased by the spring 90 in the clockwise direction relative to FIG. 4. As illustrated in FIG. 3, the stop 96 can be lifted above the rear edge of member 37 so that the spring 90 will bias the housing 71 clockwise as illustrated in FIG. 3. A multiple pulley 68 is mounted on shaft 34 and a belt 67 can be received in one of the pulley grooves of the pulley 68 and is mounted on a multiple pulley 69 which is mounted on the output shaft 75 of the motor 73.

A suitable power cord 72 supplies power to the motor 73 and an on-off switch 74 is connected in the circuit with the motor so as to energize it.

In operation, the tools 46 and 47 are spaced away from the disc 13 by adjusting the adjusting screws 91 and 92 and the crank 36 is turned by a handle 80 so as to move the tools to their inner position as illustrated in FIG. 1. Then the adjusting screws 91 and 92 are adjusted for a suitable cut on opposite sides of the disc. When this adjustment has been made, the disc and hub 12 are rotated by a suitable drive means such as the engine of the vehicle or by a suitable auxiliary motor connected to the hub 12 by attaching it to the wheel lugs 105. As the disc 13 is rotated, the spring 94 and its release 96 are moved to the position illustrated in FIG. 3 so that the spring 90 will bias the housing 71 in the counterclockwise direction as illustrated in FIG. 3, thus tightening the belt 67. The switch 74 is closed to energize the motor 73 so that shaft 75 and pulley 69 turn thus causing the belt 67 to drive the pulley 68 and the lead screw 34 so as to move the cutting tools 46 and 47 to the left relative to FIG. 1, thus machining opposite surfaces of the disc. When the cutting tools have completed a cut on the opposite face of the disc, the operator can pivot the housing 71 counterclockwise relative to FIG. 4 until the end 96 of the spring 94 locks behind the member 37 as shown in FIG. 4, thus loosening the belt 67 so that the motor 73 will no longer drive the lead screw 34 and move the carriage and the tools 46 and 47.

It is seen that this invention provides an automatic drive for a machine for cutting opposite sides of the disc and although it has been described with respect to preferred embodiments, it is not to be so limited as changes and modifications may be made therein which are within the full intended scope as defined by the appended claims.

I claim as my invention:

1. Apparatus for automatically driving a brake disc refinishing tool for refinishing vehicle brake discs while said discs are on said vehicle, and said vehicle has caliper mounting brackets, said apparatus comprising, a frame having means detachably connectable to the caliper mounting brackets adjacent to a brake disc, a tool carriage movably mounted on said frame and carrying a pair of tools engageable with opposite faces of said brake disc, a lead screw rotatably mounted on said frame and threadedly received in said carriage to drive said carriage upon rotation of said screw, means mounted on said screw to manually rotate said screw to position said carriage relative to said brake disc, a first pulley fixedly mounted on said lead screw, a motor having a power output shaft, means pivotally mounting said motor on said frame, a second pulley fixedly mounted on said output shaft of said motor, a belt trained around said first and second pulleys for transmitting power from said motor to said screw, spring means for biasing said motor away from said frame so as to tighten said belt, and releasable locking means for locking said motor to said frame in a position where said belt is loose.

2. Apparatus according to claim 1 wherein said spring means comprises a pin movably mounted on said motor and with one end engageable with said frame and a coil spring mounted on said pin to bias said frame and motor apart.

3. Apparatus according to claim 1 wherein said locking means comprises a flexible flat spring with one end attached to said motor and with a second bent end which is engageable with said frame to hold the motor relative to said frame.

4. Apparatus according to claim 3 wherein said bent end of said flexible flat spring can be manually disengaged from said frame to allow said motor to pivot to a position where said belt is tight.

* * * * *